COLOR BURST INJECTION SYSTEM

Filed March 11, 1953 2 Sheets-Sheet 1

Hugh S. Christian
Inventor
By: Jack M. Wiseman
Attorney

July 15, 1958 H. S. CHRISTIAN 2,843,658

COLOR BURST INJECTION SYSTEM

Filed March 11, 1953 2 Sheets-Sheet 2

United States Patent Office 2,843,658

Patented July 15, 1958

2,843,658

COLOR BURST INJECTION SYSTEM

Hugh S. Christian, Evanston, Ill., assignor to Raytheon Manufacturing Company, a corporation of Illinois Application March 11, 1953, Serial No. 341,741

3 Claims. (Cl. 178—5.4)

The present invention relates in general to color television transmission, and more particularly to a color multiplexer for color television transmission.

An important object of the present invention is to provide a color transmission system having a minimum of stages by providing a multiplexer having burst key-in pulses fed to the input of a color modulator, thereby eliminating a burst pulse modulator.

Another object of the present invention is to provide a multiplexer having an improved noise performance and a more stable operation by having the clamping of the signal to the color modulator and the adding of the synchronizing key-in pulses in the same stage that is coupled to the color modulator.

Another object of the present invention is to provide a multiplexer simplified in construction by providing a cathode follower mixing circuit in which the color signal is clamped thereto and in which the synchronizing pulses are impressed thereon.

Other objects and features will appear upon further perusal of the detailed description taken in conjunction with the accompanying drawings in which.

Figure 1:
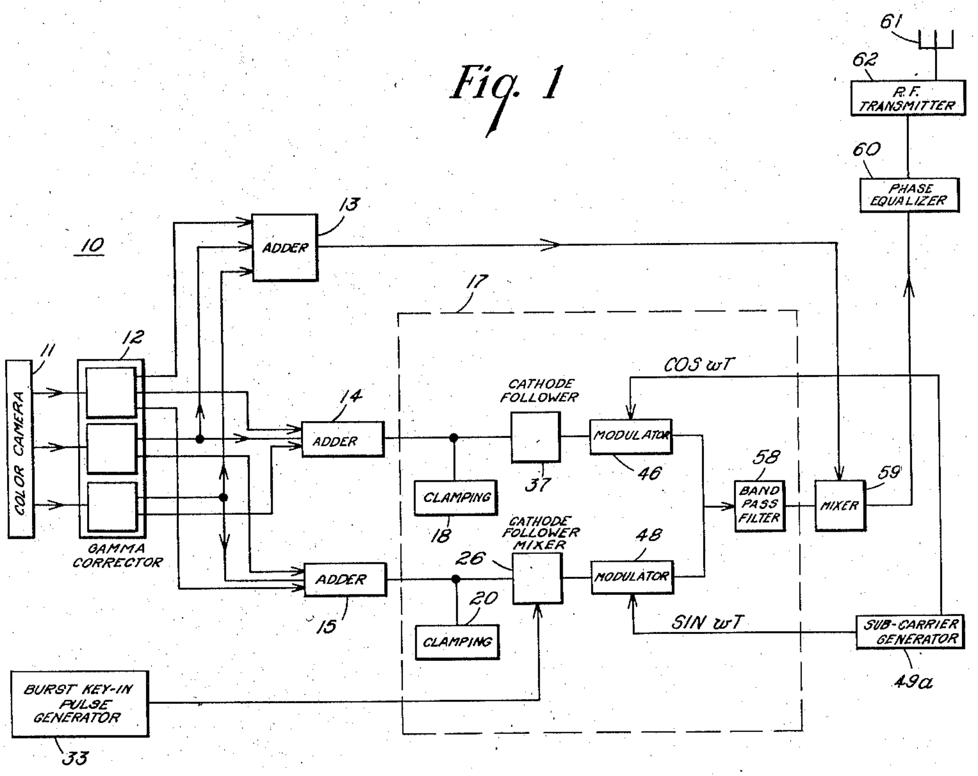
Figure 1 is a block diagram of a color transmission system utilizing the novel multiplexer embodying the present invention.

Briefly described, a multiplexer is herein provided adaptable for use in a compatible color transmitting system. The multiplexer comprises two separate color channels, one for an M color signal, and the other for an N color signal. The M and N color signals are signals derived from different spectral characteristics of the camera.

For maintaining a fixed voltage reference, at which point the multiplexer is balanced, a conventional keyed clamping circuit is provided for each color modulator of suitable double balanced color modulators. This reference must be established so that a fixed blanking or no color voltage point is established for the transmission system.

In order to provide a fixed phase of color subcarrier voltage to enable a receiver to detect the proper color signal, a burst key-in pulse is provided, which produces a pulse of fixed phase subcarrier frequency. The burst key-in pulse is produced in a conventional manner by a suitable pulse generator which unbalances the selected modulator during a blanking period.

For establishing a clamping reference level having thereon the burst key-in pulse, each color modulator is provided with a mixing circuit. The mixing circuit comprises a pair of parallel connected cathode followers. Accordingly, the fixed reference voltage is clamped to the grid of one cathode follower of each of said pairs of cathode followers and the burst key-in pulse is injected on the grid of the other cathode follower of the pair of cathode followers in a selected color channel.

The derived color signal is transmitted from the camera with a blanking pulse and is fed to grids of the one cathode follower of the pairs of cathode followers. Consequently, the one cathode follower of each pair of cathode followers has impressed on its grid a video signal including blanking which is clamped therewith and the other cathode follower of the pairs of cathode followers in the selected channel has injected on its grid the burst key-in pulse signal.

In the selected channel, the output of each pair of cathode followers has the video signal with a clamped reference voltage having thereon the burst key-in pulse. In the channel other than the selected channel, the output of the cathode followers provides a video signal with a clamped reference voltage.

For modulating the color signals, each color channel is provided with a conventional pair of balanced modulators. Each of the balanced modulators is D. C. coupled to an associated pair of parallel connected cathode followers. In the preferred embodiment each pair of balanced modulators has impressed thereon a carrier signal of 3.6 mc. The carrier signals are in quadrature phase in respect to one another. As a result thereof, the output of each pair of balanced modulators produces an envelope that is proportional to either the M or N color signals, depending upon which color signal is applied thereto. The outputs of the two pairs of balanced modulators are combined with each other to form a single subcarrier color signal modulated in both phase and amplitude. Subsequently, the single subcarrier modulated signal is combined with a monochrome signal to form a color signal.

Referring now to Figure 1, a color television transmission system 10 is herein provided, which is compatible for black and white reception. The transmission system 10 is similar to the system shown and described in the February 1952 issue of Electronics, pp. 88–95, inclusive, "Principles of NTSC compatible." The system 10 transmits simultaneously two signals. One of these signals is called the monochrome signal and determines the brightness information. The other signal is called the color subcarrier and supplies the coloring information. The two signals, when added together, produce the color signal.

Conventional color systems require the use of three primary colors. Accordingly, for producing a color signal, a conventional color camera 11 is herein provided having three operative components with assigned spectral response characteristics, such as red, green and blue. In a compatible television system the signals produced by the camera 11 are added together in such proportions that they produce a pleasing picture on a monochrome receiver.

The monochrome signal voltage can be obtained directly from a camera, whose output is proportional to luminance. In the preferred manner, the monochrome signal voltage is provided by combining the primary color signal voltages, which are derived from the three color camera 11.

The three primary color signal voltages pass through a conventional gamma corrector 12, such as a gamma corrector described in Proceedings IRE, November 1950, "A rooter for video signals," by B. M. Oliver.

For producing a monochrome signal from the primary color signals, a conventional adder circuit 13 is provided, which is connected to the output of the gamma corrector 12. An adder circuit is a circuit that combines two or more signal voltages into a common impedance as described in the book Waveforms by Chance, Hughes, MacNicole, Sayer, and Williams, published by McGraw-Hill Co. For producing derived color signals from the primary color signals, conventional adder circuits 14 and 15 are provided. The adder circuits 14 and 15 are connected to the output of the gamma corrector 12. Accordingly, the signals produced by the adder circuits 14 and 15 are derived color signals, which are herein designated as M and N signals. The gamma corrector 12 is divided into three sections. Each section represents a signal derived from one of the primary color signals, and has three output connections leading individually to the adder circuits 13, 14 and 15. Since adder circuits are essentially resistor matrix circuits, the derived color signal from each adder depends upon the circuit parameters contained therein, thereby providing an M color channel and an N color channel.

Figure 2:
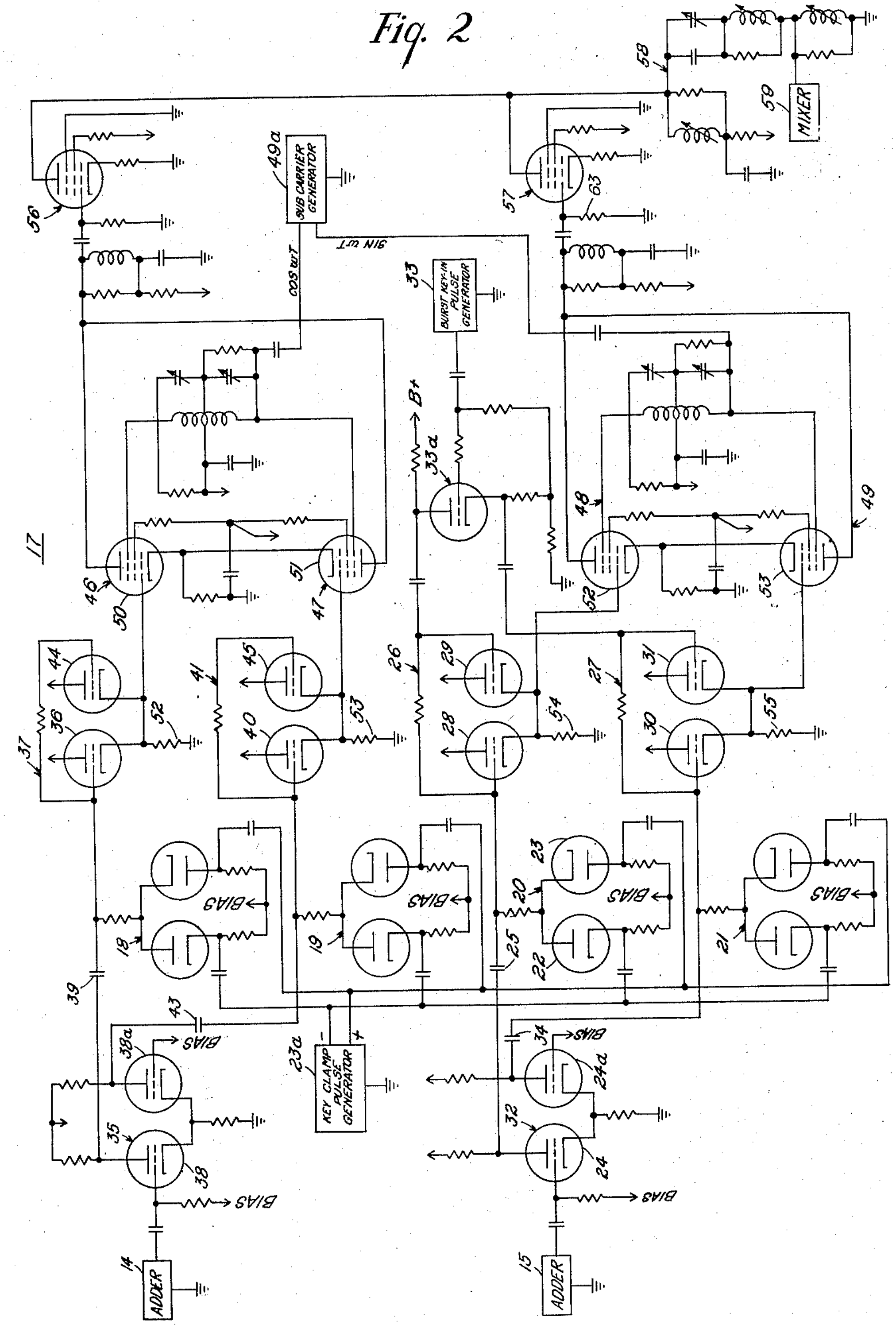
Figure 2 is a schematic diagram of the novel multiplexer embodying the present invention.

Referring now to Figures 1 and 2, for producing a modulated color subcarrier, a multiplexer circuit 17 is provided. The multiplexer circuit 17 comprises, in the preferred embodiment, two separate color channels, one for the M color signal, and the other for the N color signal. The M and N color signals are derived from different spectral characteristics of the camera 11. The M signal is received from the adder circuit 14 and the N signal is received from the adder circuit 15.

It is to be noted that the preferred embodiment provides for a balanced multiplexer, as shown in Figure 2. However, for purposes of simplicity, the corresponding duplicate components are not shown in Figure 1.

For maintaining a fixed voltage reference, at which point the multiplexer 17 is balanced, a plurality of conventional key clamping circuits 18–21, inclusive, are provided. This reference voltage must be established so that a fixed blanking or no color voltage point is established for the transmission system. The clamping circuits are of the type described in the article "Television DC components" by K. R. Wendt appearing in RCA Review, March 1948.

The clamping circuit 20 comprises two diode tubes 22 and 23 having the conductivity thereof controlled by key clamp pulses. The key clamp pulses are produced in a suitable manner by a well-known and conventional key clamp pulse generator **23*a*. The phase relationship between the key clamp pulses is such as to maintain simultaneous conductivity of the tubes 22 and 23. Diodes 22 and 23 are keyed and caused to conduct at the time the voltage to be clamped appears at the plate of tube 24. During the conducting interval, condenser 25 is caused to charge or discharge, depending upon its previous history, until the grid of tube 28 is at the same potential as the bias source. When the key clamp pulse ceases, the two diodes are non-conducting and no resistive path is open for the discharge of condenser 25 so the grid of tube 28 has been established at a fixed reference voltage. Similarly, key clamping circuits 18, 19, and 21** operate.

In order to provide a fixed phase of color subcarrier voltage to enable a receiver to detect the proper color signal, a burst of fixed phase subcarrier frequency is provided. The burst key-in pulse is produced in a well-known and conventional manner, such as pulse generator 33. The pulse is fed by the generator 33 to a conventional phase inverter **33*a***.

In a selected channel, for mixing the color difference signal, the clamping signal and the burst key-in pulses, a plurality of pairs of parallel connected cathode follower circuits 26 and 27 are provided. The cathode follower circuit 26 comprises a pair of triode tubes 28 and 29 connected in parallel. Similarly, cathode follower circuit 27 comprises a pair of triode tubes 30 and 31. The N color signal produced in the adder circuit 15 passes through a conventional phase inverter circuit 32 and is impressed on the grid of tube 28. The direct current reference voltage formed by capacitance 25 clamps the N signal onto the grid of tube 28. The burst key-in pulse is impressed on the grid of tube 29 by way of the phase inverter **33*a***. Note Figure 3 for waveform characteristics.

In a similar manner, the N color signal is formed by adder circuit 15 and then passes through the phase inverter circuit 32 which includes tubes 24 and **24*a*, where it is then impressed onto the grid of tube 30. The direct current reference voltage charging the capacitance 34 clamps the N color signal onto the grid of tube 30. The burst key-in pulse is impressed on the grid of tube 31 by way of the phase inverter circuit 33*a***.

For the M color channel, the M color signal is formed by the adder circuit 14 and passes through a conventional phase inverter circuit 35 which includes the tubes 38 and **38*a* to the grid of tube 36 of a cathode follower circuit 37. The key clamping circuit 18 provides a reference direct current voltage charging capacitor 39 to clamp the N color signal to the cathode follower circuit 37**.

Similarly, the M color signal is formed by the adder circuit 14 and passes through the phase inverter circuit 35 to the grid of tube 40 of the cathode follower circuit 41. The key clamping circuit 19 provides a reference direct current voltage charging condenser 43 to clamp the M color signal to the cathode follower 41.

It is to be noted that the cathode follower circuits 37 and 41 do not function as mixing circuits, since the tubes 44 and 45 do not have a burst key-in pulse impressed thereon. The purpose of the cathode follower circuits 37 and 41 is to maintain symmetry in the respective color channels.

For modulating a color subcarrier frequency, conventional balanced color modulators 46 and 47 are provided in the M color channel and conventional balanced modulators 48 and 49 are provided in the N color channel.

To balance out any video feed through in the modulators 46 and 47, the conventional phase inverter circuit 35 is provided, thereby providing a double balance for the color modulators 46 and 47. Similarly, the conventional phase inverter circuit 32 functions for the color modulators 48 and 49.

To provide a subcarrier frequency, which in the preferred embodiment is 3.6 megacycles, a suitable source of radio frequency energy is produced by a conventional subcarrier frequency generator **49*a*, which impresses on the second control grids of pentagrid converter tubes 50 and 51 of the modulators 46 and 47** cos *wt* phase of the subcarrier frequency. Similarly, the sin *wt* phase of the subcarrier frequency is produced by the subcarrier frequency generator **49*a* which is impressed on the second control of pentagrid converter tubes 52 and 53 of the modulators 48 and 49**, respectively. It is to be noted that the phases of the subcarrier frequency are in quadrature with respect to one another. The quadrature relationship is provided by well-known tuned circuits.

In the M channel, the first control grid of tube 50 for the modulator 46 is connected across a common load resistor 52 of the cathode follower circuit 37. The first control grid of the tube 51 for the modulator 47 is connected across a common load resistor 53 of the cathode follower circuit 41.

In the N channel, the first control grid of tube 52 for the modulator 48 is connected across a common load resistor 54 of the cathode follower circuit 26. The first control grid of the tube 53 for the modulator 49 is connected across a common load resistor 55 of the cathode follower circuit 27. The characteristic of the output waveform for the balanced modulators 48 and 49, taken across a grid resistor 63 in an adder circuit 57, is illustrated in Figure 3.

In the M channel, the output of the balanced modulators 46 and 47 are combined and received by a conventional buffer adder circuit 56. In the N channel, the output of the balanced modulators 48 and 49 are combined and received by the conventional buffer adder circuit 57. The buffer adder circuits 56 and 57 combine and M and N color signals, which are then filtered by a conventional band pass filter 58. The modulated subcarrier color signal passes through the filter 58 into a mixer stage 59, where the modulated subcarrier color signal mixes with the monochrome signal, as shown in Figure 1.

In a conventional manner, the combined signals pass through a phase equalizer circuit 60 and are transmitted by suitable means, such as the R. F. transmitter 62 and antenna 61.

Figure 3:
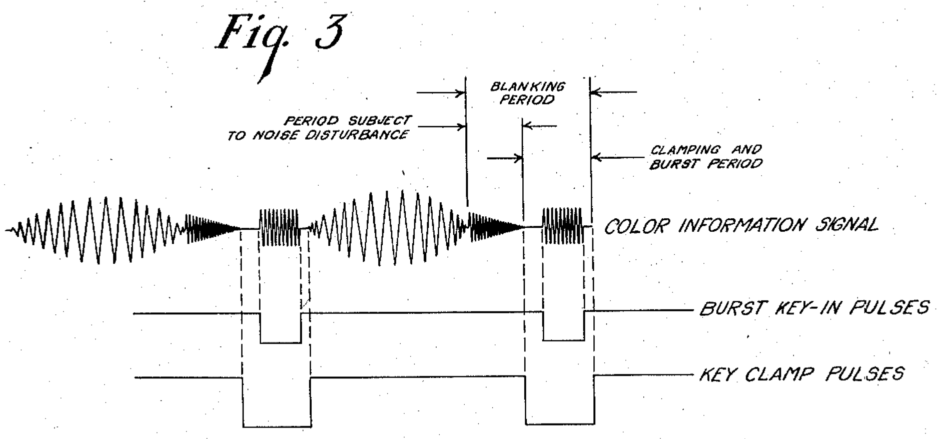
Figure 3 is a diagrammatic sketch of a waveform illustrating the clamping on the same portion of the blanking pedestal in which the burst pulse is injected in the multiplexer embodying the present invention.

Referring now to Figure 3, a diagrammatic sketch of the waveform for the output of the modulators 48 and 49 of the N color channel taken across the grid resistor 63 in the adder circuit 57 is illustrated. In order to minimize noise disturbances, the clamping is accomplished on that portion of the blanking interval in which the noise disturbance is at a minimum. In addition, the burst key-in pulse is simultaneously injected with the clamping pulse on the blanking pedestal so as to reduce spurious phase shifts in the event of adding an extra channel. The time sequence of the burst key-in pulses and the clamping pulses with respect to the derived color signal in the N color channel is also illustrated in Figure 3 and is maintained in a well-known manner by the use of a synchronizing generator.

Variations and modifications may be effected without departing from the scope of the appended claims.

I claim:

1. In a multiplexer adaptable for use in color television transmission, a cathode follower mixing circuit comprising a first and second tube, circuit means impressing a derived color signal on said first tube, a clamping circuit cyclically providing a clamped reference voltage and connected to said first tube for clamping said color signal thereto, means connected to said second tube for injecting a burst key-in pulse thereon, and a common cathode resistor for said first and second tube producing a clamped derived color signal having thereon a burst key-in pulse.

2. In a multiplexer adaptable for use in a color television transmitter, a cathode follower mixing circuit comprising a first and second tube, circuit means impressing a derived color signal on said first tube, a clamping circuit cyclically providing a clamped reference voltage and connected to said first tube for clamping said color signal thereto, a circuit connected to said second tube for injecting a burst key-in pulse thereon, a circuit in said cathode follower circuit connecting said first and second tube in parallel to provide mixing, and a common cathode resistor for said first and second tube producing a clamped derived color signal having thereon a burst key-in pulse.

3. In a multiplexer, a first and second balanced modulator, each of said balanced modulators having a first and second control grid, means for impressing a subcarrier signal on said second control grid, a first cathode follower mixing circuit comprising a first and second tube connected in parallel, a first common cathode resistor for said first and second tubes connected to the first control grid of said first balanced modulator for establishing a modulating signal, a first clamping circuit connected to the grid of said first tube for providing a clamped reference voltage, a first pulsing circuit injecting a pulse on the grid of said second tube for providing a burst key-in pulse, a second cathode follower mixing circuit comprising a third and fourth tube connected in parallel, a second common cathode resistor for said third and fourth tube connected to the first control grid of said second balanced modulator for establishing a modulating signal, a second clamping circuit connected to the grid of said third tube for providing a clamped reference voltage, a second pulsing circuit injecting a pulse on the grid of said fourth tube for providing a burst key-in pulse, and a color signal circuit impressing a color signal on the grids of said first and third tubes and in conjunction with said clamping voltages and said burst key-in pulses produce a modulating voltage for said first and second modulators to modulate said subcarrier frequencies.

References Cited in the file of this patent

UNITED STATES PATENTS

| | | |
|---|---|---|
| 2,539,454 | Mayle | Jan. 30, 1951 |
| 2,594,380 | Barton et al. | Apr. 29, 1952 |
| 2,632,046 | Goldberg | Mar. 17, 1953 |
| 2,716,151 | Smith | Aug. 23, 1955 |
| 2,729,697 | Chatten | Jan. 3, 1956 |
| 2,776,334 | Goldberg | Jan. 1, 1957 |